United States Patent
Bauer et al.

(10) Patent No.: US 8,672,381 B1
(45) Date of Patent: Mar. 18, 2014

(54) ASYMMETRICAL GRAB HANDLE FOR VEHICLE

(75) Inventors: William Bauer, Canton, MI (US); Erica Lee, Dearborn, MI (US); Pardeep Kumar Jindal, Canton, MI (US); Mangesh Kadam, Auburn Hills, MI (US); Edward Joseph Abramoski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/618,221

(22) Filed: Sep. 14, 2012

(51) Int. Cl.
   *B62D 6/00* (2006.01)
(52) U.S. Cl.
   USPC .................................... 296/1.02; 296/193.06
(58) Field of Classification Search
   USPC ......................................................... 296/1.02
   See application file for complete search history.

(56) References Cited

U.S. PATENT DOCUMENTS

| | | | |
|---|---|---|---|
| 6,647,594 B1 | 11/2003 | Deb et al. | |
| 7,235,200 B2 * | 6/2007 | Dry et al. | 264/51 |
| 7,775,573 B2 | 8/2010 | Lipke et al. | |
| 8,297,674 B2 * | 10/2012 | She | 296/1.02 |
| 8,307,516 B2 * | 11/2012 | Bartnick | 16/438 |
| 2007/0200380 A1 | 8/2007 | Stolarczyk et al. | |

FOREIGN PATENT DOCUMENTS

GB    1207044    9/1970

OTHER PUBLICATIONS

Teardrop designed handle, printed Sep. 14, 2012. http://www.diytools.co.uk/design-teardrop-handle-128mm.html.

* cited by examiner

*Primary Examiner* — Joseph Pape
(74) *Attorney, Agent, or Firm* — Vichit Chea; Price Heneveld LLP

(57) ABSTRACT

A grab handle assembly for a vehicle has an asymmetrical handle that spans between a first end and a second end. The first end is operably coupled with an A-pillar of a frame of the vehicle. The second end is operably coupled with the A-pillar below the first end. The asymmetrical handle has a slanted portion and a curved portion, configured to provide a smooth downward transition between the A-pillar and the handle and to slidably deflect a forward moving object. The slanted portion extends down from the first end at a first angle. The curved portion protrudes outward and upward from the second end at a second angle to join the slanted portion. The first angle is less than the second angle and the first angle is less than thirty-five degrees, such that the first angle provides a smooth transition to the handle.

20 Claims, 6 Drawing Sheets

ASYMMETRICAL GRAB HANDLE FOR VEHICLE

FIELD OF THE INVENTION

The present invention generally relates to grab handle assemblies for vehicles, and more specifically to an asymmetrical grab handle mounted to a vehicle pillar with at least a portion angled to provide a smooth transition between the vehicle pillar and the handle.

BACKGROUND OF THE INVENTION

Automotive vehicles are increasingly provided with grab handles as a standard feature. Grab handles are typically used to assist occupants as they enter and exit a vehicle, as well as to maintain their seated position when driving over rough terrain. Grab handles positioned on A-pillars of a vehicle frame are typically utilized in vehicles having higher elevated suspension, such as sport utility vehicles and trucks, to provide a lower grasping location for assistance with ingress into and egress from the vehicle. Accordingly, grab handles mounted in such a position typically require a robust structure and mounting configuration that causes the handle to extend into the cabin area, which can become an obstruction to occupants, such as during forward movement of an occupant head which may be initiated by a vehicle sudden deceleration or collision.

SUMMARY OF THE INVENTION

According to one aspect of the present invention, a grab handle assembly for a vehicle includes a first end, a second end, and an asymmetrical handle. The first end is operably coupled with a pillar of a frame of the vehicle. The second end is operably coupled with the pillar below the first end. The asymmetrical handle spans between the first end and the second end, and includes a slanted portion and a curved portion. The slanted portion extends down from the first end at a first angle. The curved portion protrudes outward and upward from the second end at a second angle to couple with the slanted portion. The first angle is at least ten degrees (10°) less than the second angle, and the first angle is configured to provide a smooth transition between the pillar and the handle.

According to another aspect of the present invention, an asymmetrical grab handle for a vehicle includes a first end that has a first planar mounting surface and a second end that has a second planar mounting surface coplanar with the first mounting surface. The asymmetrical grab handle also has a curved portion and a slanted portion. The curved portion protrudes outward from the second end and toward the first end. The slanted portion extends substantially linearly between the first end and the curved portion and is configured to slidably deflect a forward moving object.

According to yet another aspect of the present invention, an asymmetrical vehicle grab handle includes a first end and a second end coupled with an A-pillar. The handle has a slanted portion extending substantially linearly from the first end at a first angle from the A-pillar. In addition, the handle has a curved portion protruding outward from the second end toward the first end at a second angle from the A-pillar. The first angle is less than the second angle and the first angle is less than thirty-five degrees (35°), such that the first angle provides a smooth transition to the handle.

According to another aspect of the present invention, an asymmetrical grab handle assembly for an interior of an A-pillar of a vehicle includes a slanted portion and a curved portion. The slanted portion extends down from the A-pillar at an angle that is less than thirty-five degrees (35°) to provide a smooth downward transition between the A-pillar and the handle. The curved portion extends outward and upward from the A-pillar to join the slanted portion at a central region of the handle, forming a tear-shaped opening between the A-pillar and the handle.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
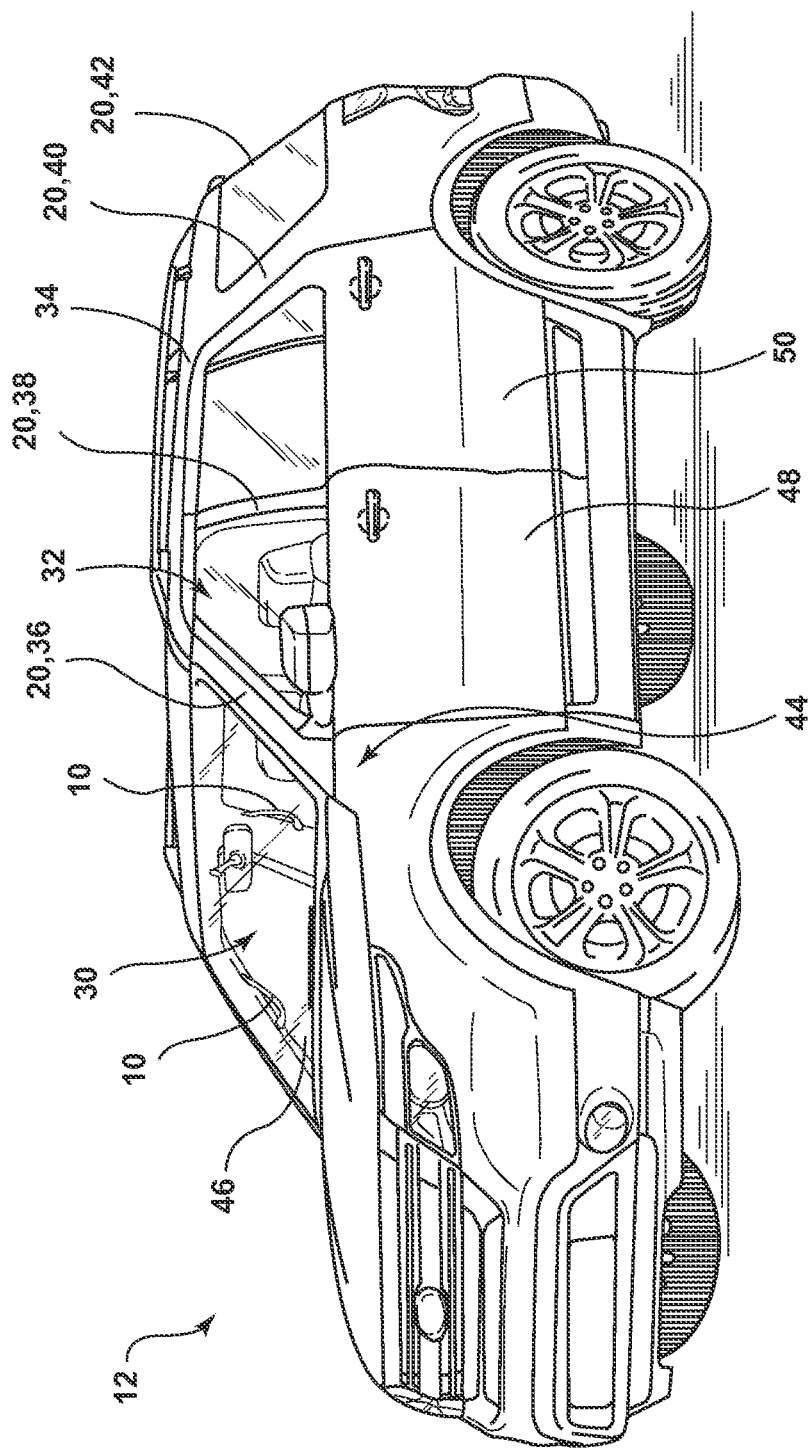
FIG. 1 is a top perspective view of a vehicle having two embodiments of a grab handle assembly in the vehicle.

For purposes of description herein, the terms "upper," "lower," "right," "left," "rear," "front," "vertical," "horizontal," and derivatives thereof shall relate to the vehicle and its grab handle assembly as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-8, reference numeral 10 generally designates a grab handle assembly for a vehicle 12 that includes a first end 14, a second end 16, and an asymmetrical handle 18. The first end 14 is operably coupled with a pillar 20 of a frame of the vehicle 12. The second end 16 is operably coupled with the pillar 20 below the first end 14. The asymmetrical handle 18 spans between the first end 14 and the second end 16, and has a slanted portion 22 and a curved portion 24. The slanted portion 22 extends down from the first end 14 at a first angle 26. The curved portion 24 protrudes outward and upward from the second end 16 at a second angle 28 to couple with the slanted portion 22. The first angle 26 is at least ten degrees (10°) less than the second angle 28, and the first angle 26 is configured to provide a smooth transition between the pillar 20 and the handle 18.

As shown in FIG. 1, the grab handle assembly 10 is positioned within an interior 30 of the vehicle 12, illustrated as a sport utility vehicle. The frame of the vehicle 12 is substantially covered by exterior body paneling and interior trim pieces. The pillars 20 of the frame extend through a window area 32 of the vehicle 12 to support a roof 34 of the vehicle 12. More specifically, the pillars separate window panes and include A-pillars 36, B-pillars 38, C-pillars 40, and D-pillars 42, with one or more of each on a driver side and a passenger side of the vehicle. The A-pillars 36 span from a body 44 of the frame to the roof 34, between a windshield 46 of the vehicle 12 and front side doors 48. The front side doors 48 are hingably coupled with and supported by each of the A-pillars 36. Similarly, the B-pillars 38 span from the body 44 of the frame to the roof 34 and include rear side doors 50 hingably coupled thereto. As illustrated, the grab hand assembly 10 is positioned on the passenger side A-pillar 36 and the passenger side B-pillar 38. It is conceived that the grab handle assembly 10 could be positioned on other pillars and in other configurations. Further, it is conceived that various vehicle types and pillar arrangements could be incorporated with the grab handle assembly 10 of the present invention.

Figure 2:
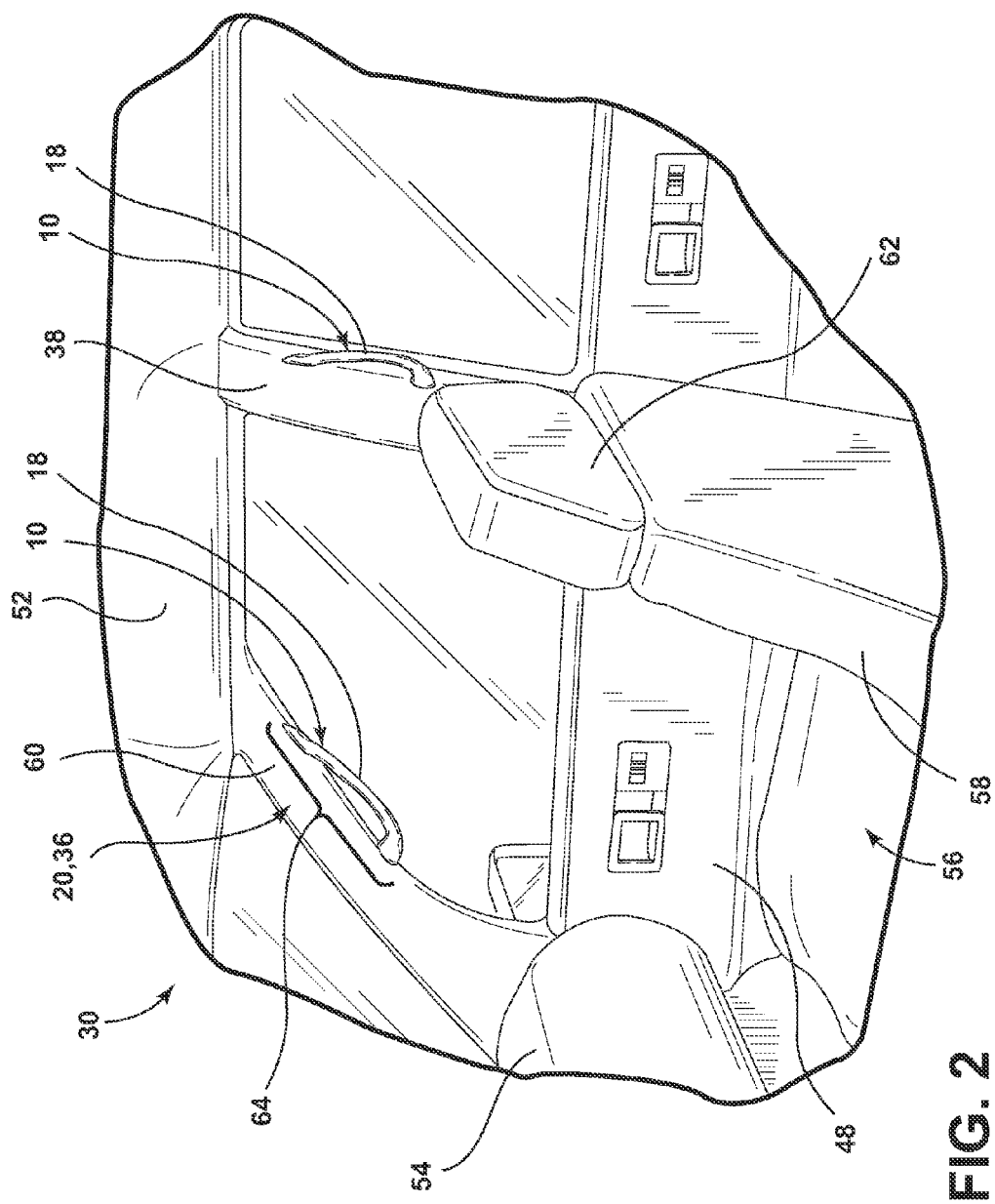
FIG. 2 is a top perspective view of an interior of a vehicle having two embodiments of a grab handle assembly.

Referring now to FIG. 2, the interior 30 of the vehicle 10 is shown having a headliner 52 defined by a bottom surface of the roof 34 of the vehicle 12 (FIG. 1). The A-pillar 36 and the B-pillar 38 extend down from the headliner 52 to support the roof 34. The A-pillar 36 spans from the headliner 52 and angles forward to a dashboard 54 of the vehicle 12. A front vehicle seat 56 is positioned adjacent to the front side door 48 and rearward from the A-pillar 36, allowing an occupant to open the front side door 48 to enter or exit the front vehicle seat 56. Accordingly, a seatback 58 of the front vehicle seat 56 is positioned adjacent the B-pillar 38.

As shown in FIG. 2, the first and second ends 14, 16 of the grab handle assembly 10 are coupled with an outer face 60 of the A-pillar 36 and positioned extending inward in the interior 30 of the vehicle 12, in one illustrated embodiment. In an additional embodiment, the first and second ends 14, 16 of the grab handle assembly 10 are coupled with the B-pillar 38 adjacent a head restraint 62 of the front vehicle seat 56. Further, the grab handle assembly 10 coupled with the A-pillar 36 is positioned proximate an intermediate segment 64 of the A-pillar 36. An occupant seated in the front vehicle seat 56 may grasp the asymmetrical handle 18 of the grab handle assembly 10 coupled with the A-pillar 36 for stability as they enter and exit the vehicle and to maintain their seated position when driving over rough terrain. For similar purposes, it is conceived that an occupant seated in a rear vehicle seat may grasp the asymmetrical handle 18 of the grab handle assembly 10 coupled with the B-pillar 38. It is conceived that the various pillar arrangements could be incorporated with the grab handle assembly 10, such as an A-pillar that is angled in closer proximity with a head of an occupant seated in the front vehicle seat.

Figure 3:
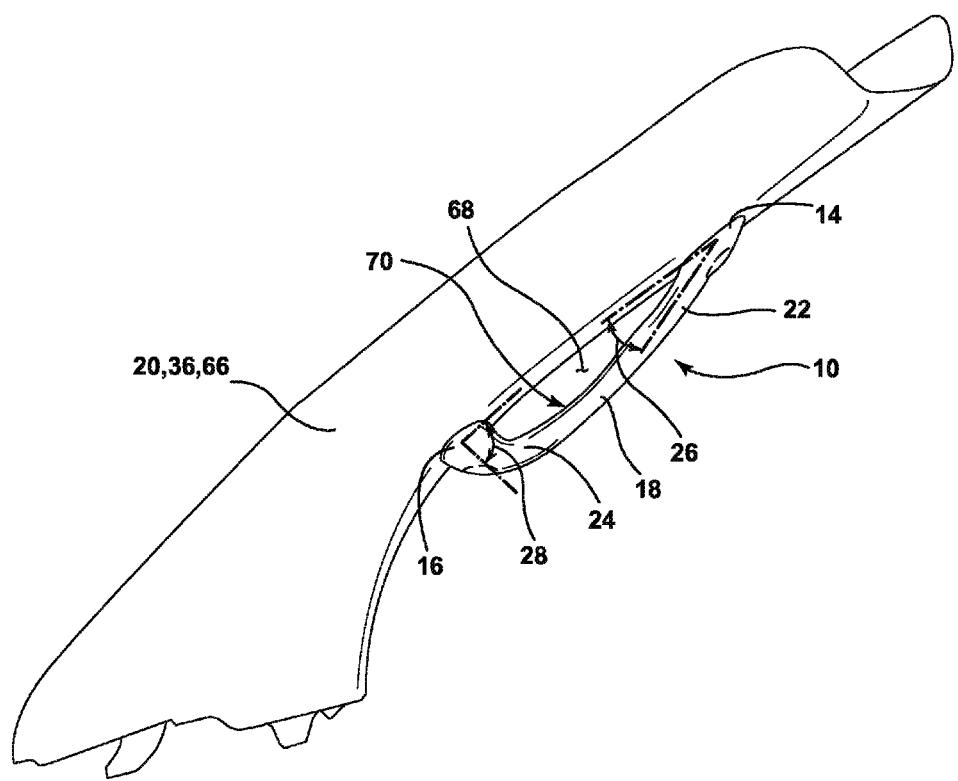
FIG. 3 is a side perspective view of the forward most grab handle assembly and an interior trim piece shown in FIG. 2.

As illustrated in FIG. 3, the grab handle assembly 10 is shown coupled with an interior trim piece 66 of the A-pillar 36 of the vehicle, such that the first end 14 is positioned above the second end 16 on the A-pillar 36. The grab handle assembly 10, as shown, includes an opening 68 between the handle 18 and the pillar 20. The opening 68 includes a tear shape and narrows from the second end 16 of the grab handle assembly 10 to the first end 14 of the grab handle assembly 10. In addition, the opening 68 is configured to provide an area sized to receive an occupant hand, namely a finger portion of the occupant hand, for grasping the handle 18 of the grab handle assembly 10.

Still referring to FIG. 3, the asymmetrical handle 18 spans between the first end 14 that is coupled with the pillar 20 and the second end 16 that is coupled with the pillar 20 below the first end 14. The asymmetrical handle 18 includes the slanted portion 22 that extends down from the first end 14 at the first angle 26 between the pillar 20 and the slanted portion 22. The slanted portion 22 extends at the first angle 26 in a substantially linear manner from the first end 14, whereby substantially linear is defined to include imperfections and a slight curvature at portions and along the entirety of the slanted portion 22. As such, it is conceived that the slanted portion 22 may be slightly curved in relation to the curved portion 24, which has a substantially greater curvature than the slanted portion 22. The first end 14 and the slanted portion 22 of the handle are configured so that a forward moving object slides relatively smoothly between the pillar 20 proximate the first end 14 and the slanted portion 22 of the handle 18, such that when the forward moving object is sliding along the pillar 20 it glides onto and along the slanted portion 22 and gently alters the object's direction of travel away from the pillar 20, without creating an obstruction to the object. In addition, the first angle 26 is configured to further provide a smooth transition between the pillar 20 and the handle 18.

As also shown in FIG. 3, the asymmetrical handle 18 includes the curved portion 24 that protrudes outward and upward from the second end 16 at the second angle 28. The curved portion 24 has a substantial curvature relative to the slanted portion 22, such that the curved portion 24 at the second end 16 first extends outward at the second angle 28 and curves upward before joining the slanted portion 22. The first angle 26 is at least ten degrees (10°) less than the second angle 28, and the first angle 26 is less than thirty-five degrees (35°). As shown, the first angle 26 is approximately twenty degrees (20°) and the second angle 28 is approximately seventy degrees (70°); however, it is conceived that these angles vary at least fifteen degrees (15°). The curved portion 24 couples with the slanted portion 22 at a central region 70 of the handle, forming a single integral piece; although it is contemplated that the slanted portion 22 may join the curved portion 24 at a lower region and that the slanted portion 22 may be a separate piece from the curved portion 24.

Figure 4:
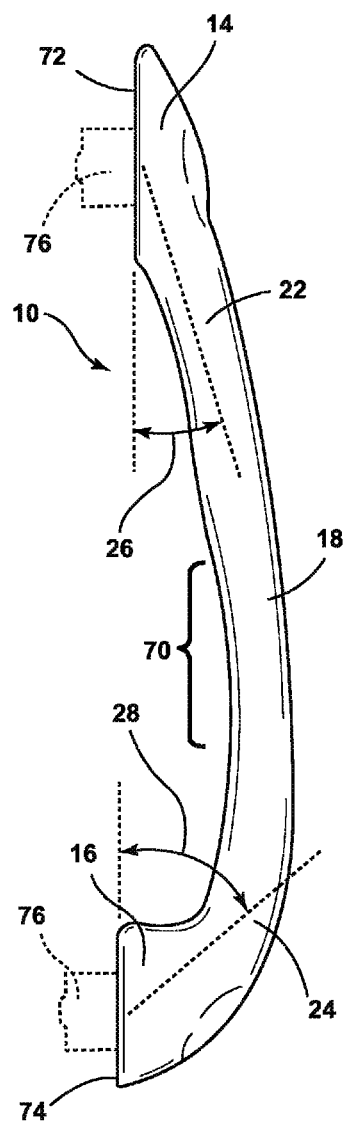
FIG. 4 is a side elevational view of a grab handle assembly shown in FIG. 3.
Figure 5:
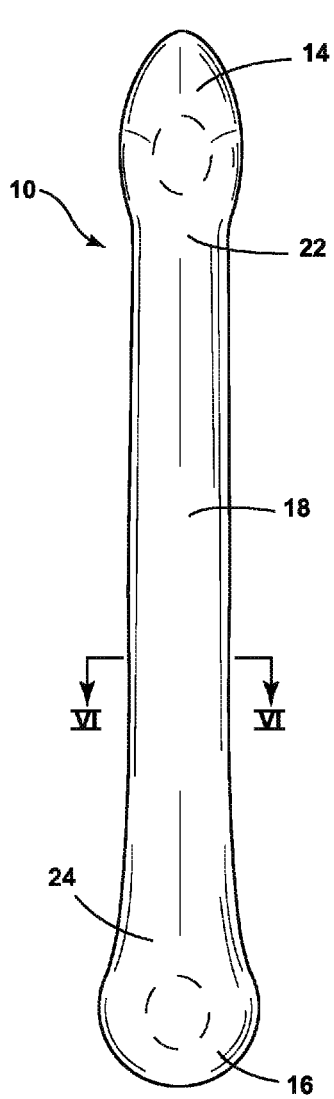
FIG. 5 is a top elevational view of a grab handle assembly.
Figure 6:
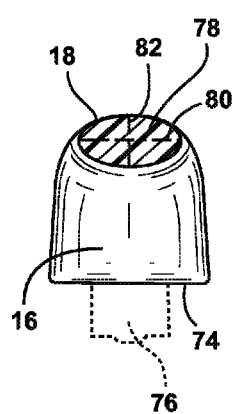
FIG. 6 is a side cross-sectional view of a grab handle assembly taken about line VI-VI of FIG. 5.

Referring now to FIGS. 4-6, the first end 14 of the asymmetrical grab handle 18 has a first planar mounting surface 72 and the second end 16 has a second planar mounting surface 74 that is coplanar with the first planar mounting surface 72. The first and second planar mounting surfaces 72, 74 are configured to couple with the outer face 60 of the A-pillar 36 (FIG. 3). Accordingly, the first and second angles 26, 28 can be shown relative to the first and second planar mounting surfaces 72, 74. As such, it is contemplated that the first and second planar mounting surfaces 72, 74 may include a curved or otherwise form-fitting shape to correlate with the shape of the pillar 20 proximate the first and second ends 14, 16. As shown in dashed lines, a connector 76 extends substantially orthogonally from the first and second planar mounting surfaces 72, 74 to couple with a pillar 20 of the vehicle 12. It is conceivable that alternative connectors may be utilized to couple the handle 18 with a pillar 20.

As shown in FIGS. 4-6, the first and second ends 14, 16 of the grab handle assembly 10 are slightly more robust than the slanted and curved portions 22, 24 of the handle 18 to provide added stability to the grab handle assembly 10. Further, the asymmetrical handle 18 is substantially tubular shaped with an elliptical shaped cross section 78, such that the first and second ends 14, 16 have the largest cross-sectional area and the handle 18 slightly tapers from the first and second ends 14, 16 toward the central region 70 of the handle 18. The elliptical-shaped cross section 78 taken about the central region 70 of the handle 18 includes a major axis 80 that is parallel with the first and second planar mounting surfaces 72, 74 and a minor axis 82 that is perpendicular to the first and second planar mounting surfaces 72, 74.

Figure 7:
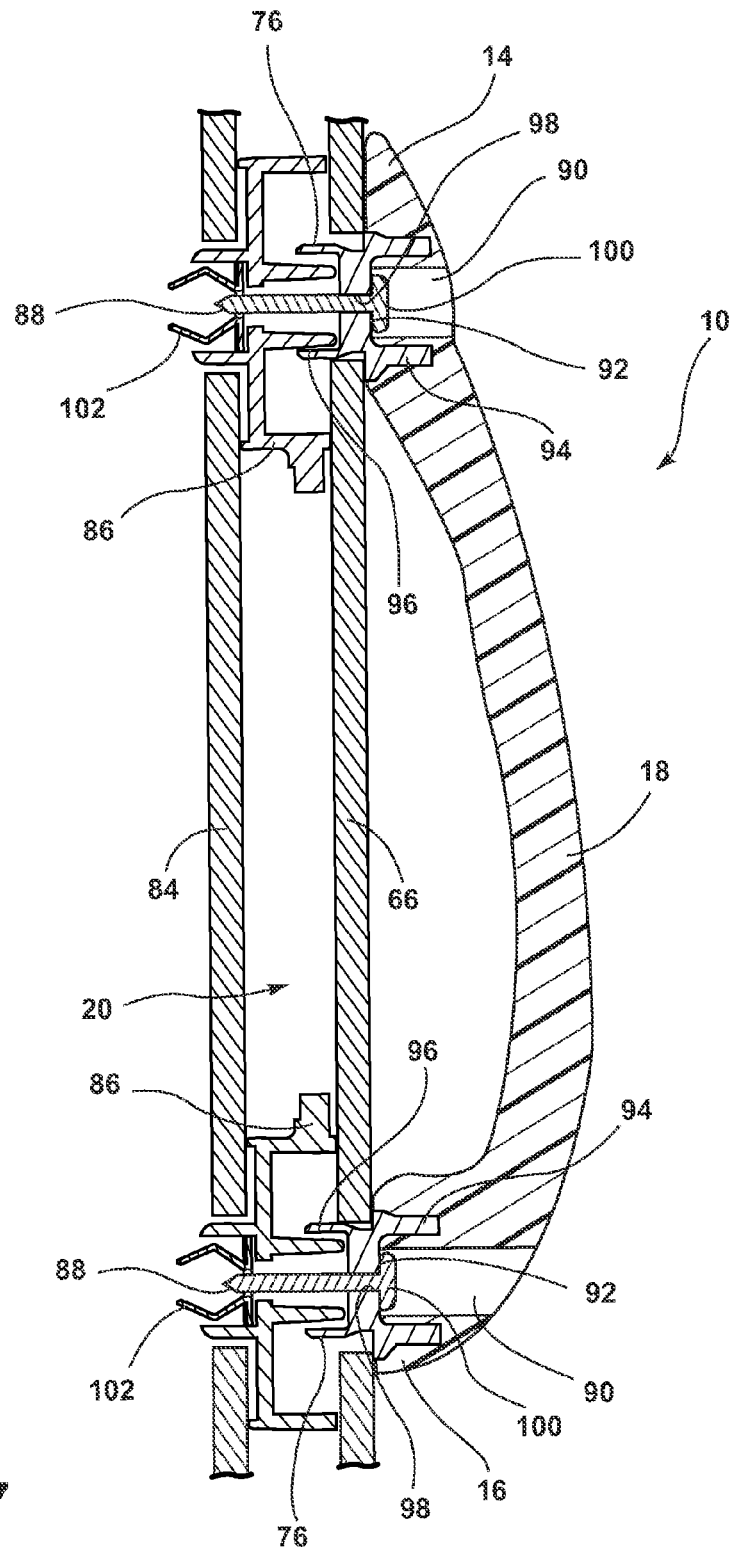
FIG. 7 is a side cross-sectional view of a grab handle assembly and a pillar of a vehicle.

Referring now to FIG. 7, the vehicle pillar 20 includes the interior trim piece 66 disposed over a core frame member 84. A spacer 86 is located between the core frame member 84 and the interior trim piece 66. A pair of fasteners 88 couple the asymmetrical handle 18 with the vehicle pillar 20. Specifically, the fasteners 88 extend through the interior trim piece 66 and the spacer 86 to couple with the core frame member 84 of the vehicle pillar 20. An aperture 90 is formed in both the first end 14 and the second end 16 of the grab handle assembly 10 for receiving the fasteners 88. At a base 92 of the aperture 90 the connector 76 extends through the interior trim piece 66 to engage the spacer 86. The connector 76 has a substantially H-shaped cross section such that a first side 94 of the connector, having a U-shaped cross section, extends into the handle 18 and a second side 96 of the connector 76, having a reverse U-shaped cross section, extends through the trim piece 66 into engagement with the spacer 86. It is conceived that the connector 76 may be tubular shaped, among other configurations, to create such cross section. The fastener 88 passes through a hole 98 centrally located in the aperture 90 that has a diameter smaller than the aperture 90. A head 100 of the fastener 88 is retained in the aperture 90 and the remainder of the fastener 88 extends though the spacer 86 to couple with a clip 102 secured to the core frame member 84. The spacer 86 is snap-fit with the core frame member 84 to couple the spacer 86 with the core 84. It is conceived that the spacer 86 and the clip 102 may be integrally formed with the interior trim piece 66, integrally formed with the core frame member 84, and integrally formed with each other.

As shown in FIG. 7, the asymmetrical handle 18 of the grab handle assembly 10 is comprised of a uniform material that is substantially flexible relative to the vehicle pillar 20. The uniform material includes a polymer-based material that is configured to absorb and deflect an impact force of an object, such as an occupant head on sudden deceleration or collision of the vehicle 12. The handle 18 is typically molded of such a uniform material. However, it is conceivable that handle 18 may comprise a plurality of materials and parts, such as a metal member covered with a polymer-based material. Further, the handle 18 or portions thereof may be covered with a fabric or leather trim material to provide addition cushion to an impact force of an object.

Figure 8:
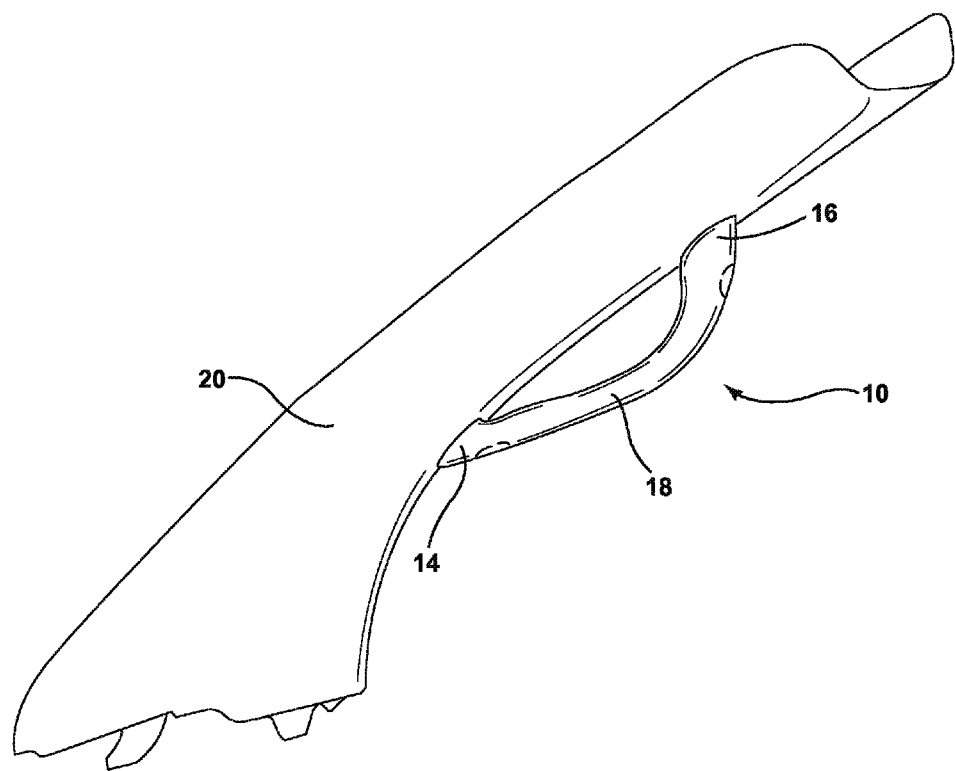
FIG. 8 is a side perspective view of an additional embodiment of a grab handle assembly and an interior trim piece.

An additional embodiment of the vehicle grab handle assembly 10 is illustrated in FIG. 8. In such an embodiment, the grab handle assembly 10 is positioned with the second end 16 above the first end 14 in substantial alignment with the pillar 20. This embodiment allows an upward and rearward moving object to be slidably deflected with a smooth transition between the pillar 20 and the handle 18, in addition to other features provided by the grab handle assembly 10, as described above.

It will be understood by one having ordinary skill in the art that construction of the described grab handle and other components is not limited to any specific material. Other exemplary embodiments of the grab handle disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be understood that any described processes or steps within described processes may be combined with other disclosed processes or steps to form structures within the scope of the grab handle. The exemplary structures and processes disclosed herein are for illustrative purposes and are not to be construed as limiting.

It is to be understood that variations and modifications can be made on the aforementioned structure without departing from the concepts of the present grab handle, and further it is to be understood that such concepts are intended to be covered by the following claims unless these claims by their language expressly state otherwise.

We claim:

1. A grab handle assembly for a vehicle, comprising:
   a pillar that extends to a headliner of the vehicle and supports a side door of the vehicle, wherein the pillar includes an interior trim piece that is disposed over a core frame member and that spans between a forward interior edge and a rearward interior edge of the pillar; and
   an asymmetrical handle rigidly coupled with a rearward surface of the interior trim piece proximate the rearward interior edge and protruding longitudinally rearward from the pillar, wherein the asymmetrical handle comprises:
      a first end operably coupled with the pillar of the vehicle;
      a second end operably coupled with the pillar above the first end;
      a slanted portion extending upward from the first end at a first angle; and
      a curved portion extending downward from the second end at a second angle to couple with the slanted portion, wherein the first angle is at least ten degrees less than the second angle and configured to provide a smooth transition between the pillar and the handle for slidably deflecting a moving object between the first end of the handle and the pillar.

2. The grab handle assembly of claim 1, wherein the asymmetrical handle has a cross-section with a solid and uniform polymeric material.

3. The grab handle assembly of claim 1, wherein the first angle is less than thirty-five degrees, and wherein the asymmetrical handle is configured so a forward moving object that impacts the first end of the asymmetrical handle slides relatively unobstructed between the slanted portion of the asymmetrical handle and the pillar.

4. The grab handle assembly of claim 1, wherein the slanted portion has a slight curvature, and wherein the curved portion has a substantially greater curvature than the slanted portion.

5. The grab handle assembly of claim 1, further comprising:
   an opening between the asymmetrical handle and the pillar that narrows from the second end to the first end to define an inverse tear shape, wherein the opening is configured to provide an area sized to receive an occupant hand for grasping the asymmetrical handle.

6. The grab handle assembly of claim 5, wherein the asymmetrical handle is molded from a material that is substantially flexible relative to the pillar, such that the asymmetrical handle is configured to absorb and deflect an impact force of an object.

7. The grab handle assembly of claim 1, wherein the pillar spans between a dashboard of the vehicle and a headliner of the vehicle to support a side door hingably coupled thereto.

8. The grab handle assembly of claim 7, wherein the pillar has an intermediate vertical segment spaced away from the dashboard and headliner, and wherein the first and second ends are coupled with the interior trim piece of the pillar proximate the intermediate vertical segment of the pillar.

9. The grab handle assembly of claim 1, wherein the pillar includes a spacer between the interior trim piece and the core frame member, and wherein a pair of fasteners extend through the interior trim piece and the spacer to couple the first end and the second end with the core frame member.

10. An asymmetrical grab handle for a vehicle pillar, comprising:
   a top end;
   a bottom end;
   a curved portion curving downward from the top end toward the bottom end; and
   a slanted portion extending upward from the bottom end at an angle less than thirty-five degrees from the vehicle pillar for slidably deflecting a rearward moving object, wherein the slanted and curved portions are integrally attached and together protrude longitudinally rearward from the vehicle pillar.

11. The grab handle of claim 10, wherein the slanted portion extends upward and longitudinally rearward at a first angle from the vehicle pillar and the curved portion extends downward and longitudinally rearward at a second angle from the vehicle pillar to define an inverse tear-shaped opening between the asymmetrical grab handle and the vehicle pillar.

12. The grab handle of claim 11, wherein the first angle is configured so a forward moving object slides relatively unobstructed between the vehicle pillar and the slanted portion of the asymmetrical grab handle.

13. The grab handle of claim 11, wherein the first angle is less than twenty-five degrees, and wherein the second angle is at least twenty degrees greater than the first angle, such that the handle is configured so a forward moving object slides relatively unobstructed between the vehicle pillar and the bottom end of the asymmetrical grab handle.

14. The grab handle of claim 10, wherein the top and bottom ends have a first planar mounting surface and a second planar mounting surface, respectively, that are configured to couple with an interior trim piece of the vehicle pillar.

15. The grab handle of claim 14, wherein the interior trim piece of the vehicle pillar is disposed over a core frame member and a spacer between the core frame member and the interior trim piece, and wherein a pair of fasteners extend through the interior trim piece and the spacer to couple the grab handle with the core frame member.

16. The grab handle of claim 10, further comprising:
   a tear-shaped opening between the slanted and curved portions of the asymmetrical grab handle and the vehicle pillar, wherein the tear-shaped opening narrows from the top end to the bottom end and is configured to provide an area sized to receive an occupant hand for grasping the handle.

17. The grab handle of claim 10, wherein the slanted portion of the grab handle assembly is substantially flexible, such that the slanted portion is configured to absorb and deflect an impact force of an occupant head on collision.

18. An asymmetrical grab handle for an A-pillar of a vehicle, comprising:
   a top end and a bottom end coupled with an interior trim piece of the A-pillar proximate a rearward edge of the A-pillar adjacent to a side door window of the vehicle;
   a slanted portion extending upward and longitudinally rearward from the bottom end at a first angle away from the A-pillar; and
   a curved portion protruding downward and rearward from the bottom end at a second angle away from the A-pillar, wherein the slanted and curved portions are integrally attached and have a cross-section with a solid and uniform polymeric material, and wherein the first angle is less than the second angle and thirty-five degrees to provide a smooth transition between the A-pillar and the slanted portion for rearward moving objects that impact the A-pillar below the bottom end of the asymmetrical grab handle.

19. The grab handle of claim 18, wherein the bottom end is positioned below the top end and the curved portion protrudes outward and downward at the second angle from the A-pillar to couple with the slanted portion to define an inverse tear-shaped opening between the A-pillar and the slanted and curved portions of the grab handle.

20. The grab handle of claim 18, wherein the interior trim piece is disposed over a core frame member and a spacer is disposed between the core frame member and the interior trim piece, and wherein a pair of fasteners extend through the interior trim piece and the spacer to couple the top and bottom ends of the grab handle with the core frame member.

* * * * *